Jan. 27, 1970   G. MEHNERT   3,491,404

BLOW MOLDING APPARATUS

Filed July 6, 1967   2 Sheets-Sheet 1

INVENTOR:
Gottfried Mehnert
BY Michael S. Striker,
Attorney

United States Patent Office 3,491,404
Patented Jan. 27, 1970

3,491,404
BLOW MOLDING APPARATUS
Gottfried Mehnert, Lankwitzerstrasse 14–15,
Berlin-Mariendorf, Germany
Filed July 6, 1967, Ser. No. 651,502
Claims priority, application Germany, July 22, 1966,
M 70,327
Int. Cl. B29c 5/06
U.S. Cl. 18—5                        20 Claims

ABSTRACT OF THE DISCLOSURE

The sections or halves of the mold in a blow molding apparatus are carried by and can move horizontally relative to two platens which are connected to a skeleton frame by means of hinges having horizontal pintles. The frame includes two pairs of profiled metallic uprights, one pair for each platen, and each platen is biased by springs which are disposed above and below the respective pintles to maintain the platens in normal vertical positions. The uprights of one pair are connected with the uprights of the other pair by upper and lower tie rods which respectively support a reciprocable severing device for parisons and a reciprocable blowing unit with one or more blowing mandrels. A second frame on top of the skeleton frame supports a rail for the extrusion head, plasticizing cylinder and a further cylinder which latter transfers plasticized material into the extrusion head.

BACKGROUND OF THE INVENTION

The present invention relates to blow molding apparatus in general, and more particularly to improvements in blow molding apparatus which can be used with advantage for automatic production of relatively large blow-molded articles. Still more particularly, the invention relates to improvements in mounting of the extrusion head, mold sections and blowing mandrel or mandrels in a blow molding apparatus.

Manufacturers of blow molding apparatus normally strive to construct the apparatus in such a way that the operation is continuous, i.e., that a fresh parison is being extruded while the preceding parison undergoes deformation in the cavity of the blow mold. Such mode of blow molding is quite satisfactory for the production of relatively small blow-molded articles. However, if the articles are rather bulky, the apparatus normally operate discontinuously, i.e., a parison will be extruded only upon completed blowing of the preceding parison. My present invention relates to improvements in this second class of blow molding apparatus.

Discontinuous operation of blow molding apparatus for the production of large articles is desirable in order to avoid the necessity for moving the entire mold into and from the blow molding station. Molds which are used for conversion of relatively large parisons into bulky articles are quite heavy and bulky and, therefore, bodily shifting of such molds to and away from registry with the extrusion head would contribute excessively to the initial and maintenance cost of blow molding apparatus.

In certain presently known blow molding apparatus for discontinuous production of relatively large hollow blow-molded articles, the cylinders which move the mold sections toward and away from each other are mounted on base plates which are connected to each other by sturdy beams. The beams further serve to guide the holders for mold sections. A serious drawback of such apparatus is that the beams will flex in response to relatively large sealing pressures which develope when the mold sections are moved into and held in sealing engagement with each other. Any flexing or bending of beams will prevent complete closing and sealing of the mold so that the material of the parison can escape between the meeting faces of the mold sections with resultant damage to or destruction of the parison. At the very best, flexing or bending of beams will result in the production of inferior blow-molded articles. Furthermore, and since the beams extend between the holders for the mold sections, they interfere with the work of operators when it becomes necessary to inspect, clean, remove or reinstall the mold sections and/or the holders for such sections. The problem is particularly acute when the apparatus utilize very large, bulky and heavy holders and/or mold sections.

Attempts to avoid the just described drawbacks of conventional blow molding apparatus include the provision of holders for mold sections which are mounted solely on the piston rods of closing cylinders. The piston rods are of polygonal outline and are held against turning by matching bearing sleeves. Such proposal is equally unsatisfactory for the production of large blow-molded articles because the piston rods are likely to flex or bend and also because the piston rods, their cylinders and the supports for the cylinders must be overdimensioned to insure that the mold sections will move into proper sealing engagement with each other and will withstand very large sealing pressures. If the supports for the piston rods are bulky and heavy, they occupy too much room in the area below the mold sections so that it is quite difficult to install and/or gain access to other equipment which is necessary in a blow molding apparatus. Furthermore, this interferes with rapid evacuation of finished articles and prevents the utilization of automatic programming systems.

Accordingly, it is an important object of the present invention to provide a novel and improved blow molding apparatus wherein the sections of the blow mold are installed, supported and guided in a novel way so that the parts which support and effect movements of mold sections into and from sealing engagement with each other occupy little room but invariably prevent uncontrolled tilting or other undesirable displacements of the mold sections.

Another object of the invention is to provide a blow molding apparatus for discontinuous or intermittent production of relatively large blow-molded articles wherein eventual deformation of parts which support and guide the mold sections cannot prevent proper sealing of the mold cavity.

A further object of the invention is to provide a blow molding apparatus wherein the blowing mandrel or mandrels, the extrusion head, the plasticizing unit and/or certain other components of the apparatus are mounted in a novel way to facilitate their inspection, cleaning, removal or reinsertion.

An additional object of the invention is to provide a novel mode of mounting the operating means which are used to move the mold sections of a blow molding apparatus into and from sealing engagement with each other.

A concomitant object of the invention is to provide a blow molding apparatus wherein all stages of an operating cycle can be regulated by automatic programming means and wherein the parts which support and guide the mold sections leave a large space in the region below the blow molding station so that the articles can be removed from the mold in a very simple and time-saving way.

Still another object of the invention is to provide a sturdy and inexpensive frame which can be used in the above outlined apparatus to support and to guide the mold sections.

An ancillary object of the invention is to provide a novel device which can sever and support successive parisons during conversion into blow-molded articles.

SUMMARY OF THE INVENTION

One feature of my invention resides in a combination which is embodied in a blow molding apparatus for conversion of tubular parisons into relatively large hollow plastic articles. The combination comprises a skeleton frame including a stationary base, spaced first and second upright means extending upwardly from the base and each preferably comprising two parallel vertical uprights of profiled metallic stock, and horizontal tie rod means connecting the first and second upright means and preferably including pairs of upper and lower tie rods, a pair of platens or carriers disposed between the first and second upright means, hinge means articularly connecting each platen to one of the upright means, preferably in such a way that the platens can pivot about horizontal axes, a pair of mold sections disposed between the two platens, operating means provided on each platen for moving the mold sections toward and away from sealing engagement with each other whereby the hinges compensate for eventual deformation of the skeleton frame in response to relatively high sealing pressures, and resilient means operating between the upright means and the respective platens to maintain the platens in normal or vertical positions. Such resilient means preferably includes dished springs or other types of springs disposed above and below the pivot axes of the platens.

The lower tie rods can support and guide a reciprocable blowing unit which can place one or more blowing mandrels into registry with a parison extruded downwardly through the nozzle of an extrusion head which is carried by the skeleton frame at a level above the mold sections. The extrusion head and certain other units which are needed in a blow molding apparatus are preferably reciprocable along a horizontal rail supported by a second frame which is secured to the top portions of the upright means. The upper tie rods may support a severing or separating device provided with grippers which can engage and separate freshly extruded parisons from the next-following parisons and which are preferably arranged to lower severed parisons and to hold such parisons during conversion into hollow blow-molded articles.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
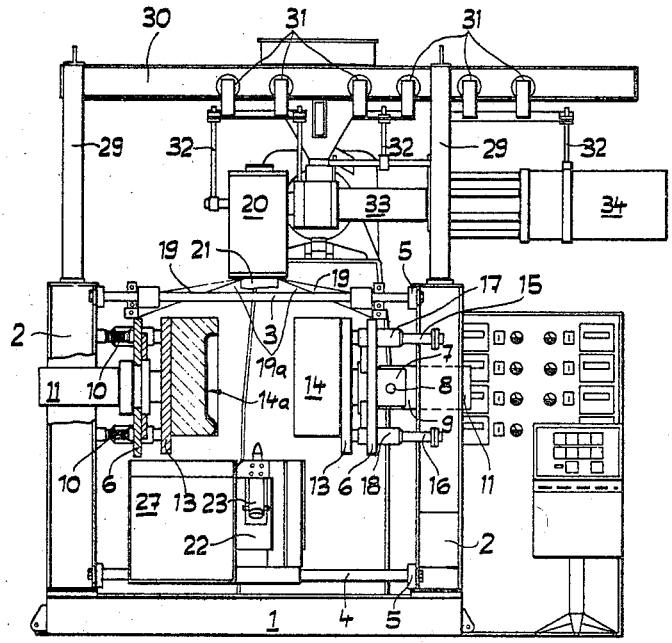
FIG. 1 is a front elevational view of a blow molding apparatus which embodies the present invention.
Figure 2:
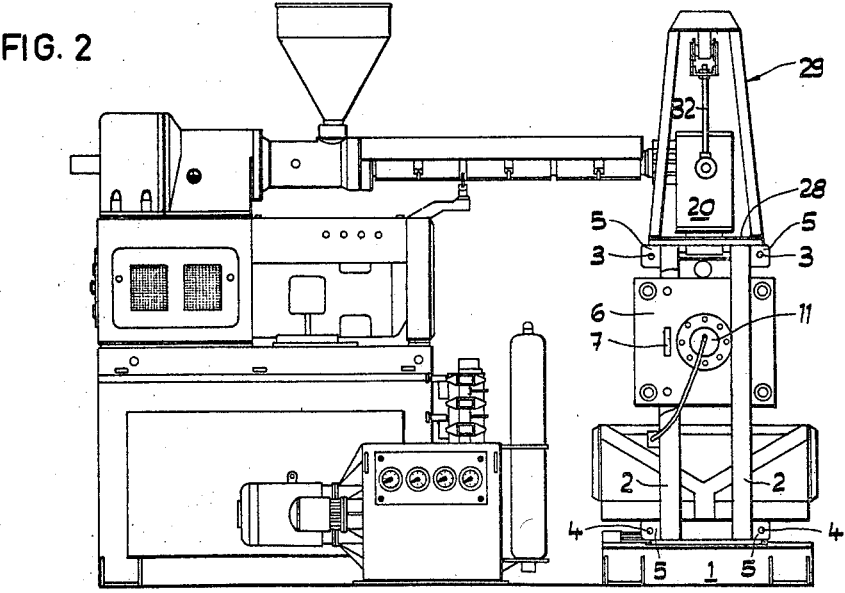
FIG. 2 is a side elevational view as seen from the left-hand side of FIG. 1.
Figure 3:
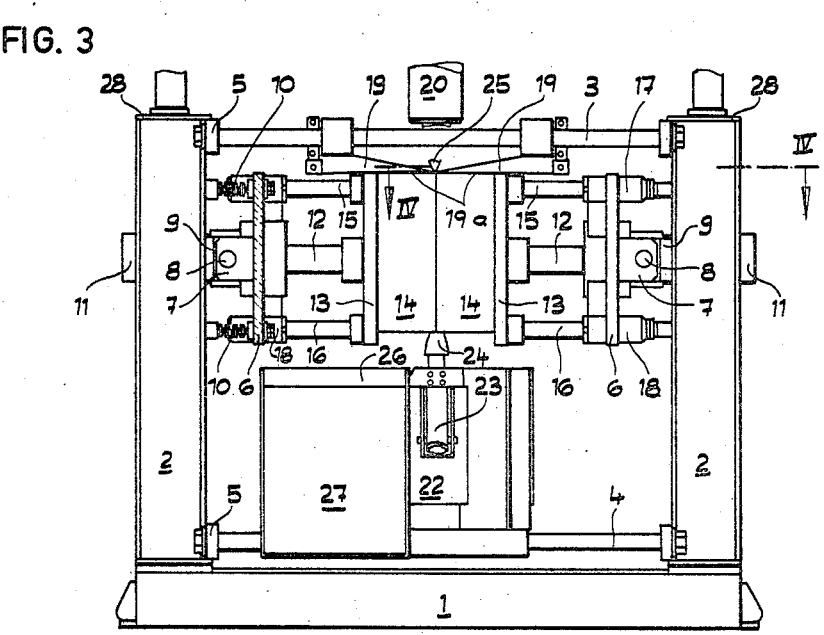
FIG. 3 is a larger-scale fragmentary view of a detail of the apparatus shown in FIG. 1, substantially as seen in the direction of arrows from the line III—III of FIG. 4.
Figure 4:
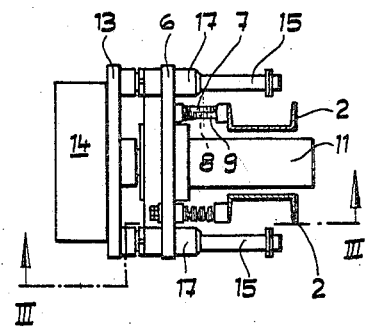
FIG. 4 is a fragmentary horizontal sectional view as seen in the direction of arrows from the line IV—IV of FIG. 3.

Referring first to FIGS. 1 to 3, the blow molding apparatus comprises a main support or base 1 which forms part of a skeleton frame and carries two pairs of uprights 2 each of which is constituted by a profiled metallic bar of U-shaped cross-sectional outline (see FIG. 4). The uprights 2 of one pair are rigidly connected to the uprights of the other pair by means of upper and lower horizontal tie rods 3 and 4. The end portions of tie rods 3, 4 are provided with external threads and mesh with nuts 5 welded to the respective uprights 2. The apparatus further comprises two supporting platens or carriers 6 each of which is articulately connected with a pair of uprights 2 by means of hinges having horizontal pintles 8 (see FIG. 3), first leaves or plates 7 welded to the outer sides of the respective platens 6 and second leaves or plates 9 welded to the corresponding uprights. Each platen 6 is held in a substantially vertical normal position by biasing means including suitable springs, for example, packages of dished springs 10. As best shown in FIG. 3, the springs 10 are provided above and below each pintle 8 so that the platens 6 are automatically centered and are then located in substantially vertical planes.

Each platen 6 carries a double-acting hydraulic or pneumatic mold closing cylinder 11 whose piston rod 12 is attached to the respective plate like holder 13 for one of two separable mold sections 14. The holders 13 are disposed in the space between the platens 6 and are movable toward and away from each other between the retracted positions shown in FIG. 1 and the closing or sealing positions shown in FIG. 3. The manner in which the mold sections or halves 14 are attached to the respective holders 13 is known from the art of blow molding apparatus. When the mold sections 14 are caused to move into sealing engagement as shown in FIG. 3, they define a composite mold cavity whose outline corresponds to the desired outline of the blow-molded article. Each platen 6 further carries upper and lower bearing sleeves 17, 18 (see FIG. 1) for upper and lower guide rods 15, 16 which are affixed to the respective holders 13 and serve to guide such holders when the piston rods 12 move with reference to the associated cylinders 11.

The upper tie rods 3 support a severing device for parisons 21. This severing device comprises two grippers or arms 19 which are movable lengthwise as well as vertically at right angles to the axes of the upper tie rods 3. The severing device operates in such a way that the grippers 19 move toward each other while their parison-engaging and severing portions 19a assume the upper end positions shown in FIG. 1. The portions 19a then engage a parison 21 directly below the annular orifice of the nozzle in an extrusion head 20 which is mounted at a level above the mold sections 14. The parison 21 is clamped and squeezed by the portions 19a which initiate severing or separation of the parison 21 directly below the aforementioned orifice. The grippers 19 securely clamp the parison 21 and move therewith vertically downwardly to assume the lower end positions shown in FIG. 3 whereby the parison is completely separated from the next-following parison in the extrusion head 20 and enters the space between the mold sections 14 which are held in spaced-apart positions. In the next step, the mold is closed by admission of a suitable pressure medium to the closing cylinders 11 so that the piston rods 12 travel toward each other and shift the holders 13 and mold sections 14. Eventual flexing or bending of tie rods 3, 4 and/or uprights 2 is compensated for by the springs 10 which insure that the mold sections 14 are in full face-to-face sealing engagement with each other and prevent uncontrolled escape of plasticized material of the parison 21 from the mold cavity. Eventual flexing or bending of tie rods 3, 4 and/or uprights 2 could take place during the last stage of movement of the mold sections 14 into sealing engagement with each other.

The apparatus of my invention further comprises a blowing or expanding unit 22 which is reciprocable along the lower tie rods 4 at a level below the mold sections 14. FIG. 1 illustrates the blowing unit 22 in operative position in which its blowing mandrel 23 registers with the nozzle of the extrusion head 20. The axis of the mandrel 23 is then located in the plane in which the faces of the sections 14 meet when the mold is closed by the piston rods 12. Upon completed closing of the mold, the mandrel 23 of the blowing unit 22 is caused to move upwardly and to enter the open lower end portion 24 of the parison which is held by the grippers 19 and whose major part is accommodated in the cavity defined by the mold sections 14. It is to be noted that the dimensions of the end portions 24, 25 of the parison 21 which is accommodated in the mold cavity are greatly exaggerated in FIG. 3 for the sake of clarity; in actual practice, the length of such end portions is in the range of one or more millimeters.

When the blowing mandrel 23 has completed the admission of air or another gas, i.e., when the parison 21 in the cavity defined by the mold sections 14 is expanded and forms a hollow blow-molded article, the blowing unit 22 causes the mandrel 23 to move downwardly and to reassume the position shown in FIG. 1. The blowing unit 22 is then shifted along the lower tie rods 4 so as to place a chute 26 into registry with the blow-molded article between the mold sections 14. These mold sections are moved apart so that the blow-molded article is held solely by the grippers 19. In the next step, the grippers 19 are moved apart by travelling along the upper tie rods 3 and their portions 19a are caused to return to the upper end positions shown in FIG. 1 so that they are ready to engage and pinch the next parison 21. The thus released blow-molded article drops through the chute 26 and travels through or along a take-off device 27 which can deliver it to a suitable transporting conveyor or into a receptacle for travel to storage or to another processing station.

The upper end portions of transversely aligned uprights 2 are connected to each other by horizontal plates 28 (FIGS. 2 and 3) which carry a second frame 29 preferably consisting of profiled metallic stock. The frame 29 supports a horizontal rail 30 which is disposed at a level above, midway between and in parallelism with the upper tie rods 3. The purpose of the rail 30 is to support and to permit lengthwise movements of several units which form part of the blow molding apparatus, such units including the aforementioned extrusion head 20, a plasticizing cylinder 33 and a hydraulic cylinder 34 which effects transfer of plasticizing material from the cylinder 33 into the head 20. The units 20, 33, 34 are suspended on wheeled carriages or trolleys 31 by means of vertically adjustable suspension bars 32. The wheels of carriages 31 can travel along the flanges of the rail 30. Such mounting of the units 20, 33, 34 facilitates their movements along the rail 30 for the purpose of cleaning, inspection and/or repair. During cleaning, the head 20 can be disconnected and moved away from the cylinder 33. In the same way, the cylinder 33 can be disconnected and moved away from the cylinder 34, or vice versa.

The space below the mold sections 14 is large enough to accommodate two or more blowing mandrels each of which can be secured to the casing or housing of the blowing unit 22. Furthermore, such space can accommodate a conventional spreading device for parisons 21. Such spreading devices are used in blow molding apparatus for conversion of cylindrical parisons into relatively flat hollow blow-molded articles, particularly canisters with inclined inlet portions. The large space below the mold sections 14 renders it possible to install or remove the blowing unit 22, its mandrel or mandrels 23 and/or the aforementioned spreading device with little loss in time. It is further clear that the mandrel or mandrels 23 can be replaced with needles or with axially movable mandrels which are installed in the extrusion head 20 in a manner well known from conventional blow molding apparatus. Spreading devices which can be utilized in the apparatus of my invention are disclosed, for example, in German Patents Nos. 1,178,580 and 1,223,136. Mandrels which are movable axially in an extrusion head are disclosed in German Patent No. 1,080,769.

The two pairs of profiled uprights 2 are disposed at the opposite sides of the plane in which the sections 14 meet when the mold is closed by the piston rods 12. Each upright 2 of one pair is connected to one upright of the other pair by two tie rods 3, 4, and the uprights of each pair are connected to each other by the base 1 and plates 28. Such construction of the skeleton frame which carries the platens 6 renders it possible to utilize the apparatus of my invention in the production of large blow-molded articles. This skeleton frame is exceptionally rigid and can be produced and assembled at relatively low cost. The mold sections 14 and their holders 13 are readily accessible so that such parts can be inspected, adjusted and/or removed or reinstalled with little loss in time. The springs 10 insure satisfactory closing and sealing of the mold even if the uprights 2 and/or tie rods 3, 4 happen to blend or flex slightly in response to very high sealing pressures.

The mandrel 23 can cooperate with the lower portions of mold sections 14 to calibrate the neck portion of a bottle or other hollow blow-molded article which is being produced in the apparatus of my invention. As shown in FIG. 1, the left-hand mold section 14 is formed with a cavity 14a whose outline resembles the outline of one-half of a bottle. The right-hand mold section 14 is formed with a similar cavity.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

What is claimed is:

1. In a blow molding apparatus for conversion of tubular parisons into hollow articles, a combination comprising a skeleton frame including a base, spaced first and second upright means extending upwardly from said base, and horizontal tie rod means connecting said first and second upright means; a pair of platens disposed between said first and second upright means; hinge means articulately connecting each of said platens to one of said upright means; a pair of mold sections disposed between said platens; and operating means provided on each of said platens for moving said mold sections into and away from sealing engagement with each other.

2. A combination as defined in claim 1, further comprising resilient means disposed between said platens and the respective upright means for normally maintaining each of said platens in a neutral position.

3. A combination as defined in claim 2, further comprising a holder for each of said mold sections, each of said holders being disposed between one of said platens and the respective mold section and each of said operating means comprising a cylinder member and a piston rod member slidably received in said cylinder member, one of said members being affixed to one of said platens and the other member being affixed to the respective holder.

4. A combination as defined in claim 3, further comprising guide means for each of said holders, each of said guide means comprising at least one bearing sleeve affixed to one of said platens and a guide rod slidably received in said sleeve and affixed to the respective holder to share the movements of such holder on actuation of the respective operating means.

5. A combination as defined in claim 2, wherein each of said upright means comprises a plurality of substantially vertical uprights consisting of profiled metallic stock.

6. A combination as defined in claim 1, further comprising an extrusion head supported by said frame at a level above said mold sections and arranged to extrude a succession of tubular parisons vertically downwardly, and severing means comprising a pair of grippers supported by said tie rod means and being movable between said mold sections and said head to engage a freshly extruded parison in response to movement toward each other and to sever such parison from the next-following parison while said operating means maintain the mold sections in spaced-apart positions so that the thus separated parison is ready to be enclosed by the mold sections when the operating means cause the sections to move into sealing engagement with each other.

7. A combination as defined in claim 6, wherein said tie rod means include upper and lower tie rods respectively disposed above and below said mold sections, said grippers being supported by said upper tie rods.

8. A combination as defined in claim 7, wherein said mold sections define between themselves a cavity wherein the parison held by said grippers is expanded to form a hollow article while said sections are in sealing engagement with each other, said grippers being arranged to hold the upper end portion of the parison and of the article into which the parison is converted prior, during and subsequent to movement of said sections into sealing engagement with each other as well as during return movement of said sections away from each other.

9. A combination as defined in claim 7, wherein said grippers are movable lengthwise of as well as upwardly and downwardly relative to said upper tie rods to respectively assume upper and lower positions, said grippers having parison-engaging portions which engage the upper end of a freshly extruded parison in the upper positions of said grippers and separate such parison from the next-following parison during movement of said grippers to lower positions.

10. A combination as defined in claim 1, wherein said tie rod means comprises tie rods disposed at a level below said mold sections and further comprising an extrusion head provided on said frame above said sections and arranged to extrude a succession of tubular parisons vertically downwardly so that such parisons may extend into the space between said mold sections when the sections are moved away from each other, and blowing means including a vertical blowing mandrel and being movable along said tie rods to place said mandrel into registry with the lower end of a freshly extruded parison.

11. A combination as defined in claim 10, wherein said mandrel is movable up and down to respectively penetrate into and to be withdrawn from the lower end of a parison between said mold sections, said mandrel being arranged to introduce into parisons a compressed gas to expand such parisons against the internal surfaces of said mold sections when the sections are held in sealing engagement with each other whereby the thus expanded parisons form hollow blow-molded articles.

12. A combination as defined in claim 11, further comprising take-off means movable along said tie rods into registry with said extrusion head to receive blow-molded articles upon movement of said mold sections away from sealing engagement with each other.

13. A combination as defined in claim 12, wherein said take-off means is connected with said blowing means.

14. A combination as defined in claim 13, further comprising a chute movable with and arranged to direct blow-molded articles into said take-off means.

15. A combination as defined in claim 1, further comprising at least one horizontal rail carried by said upright means at a level above said mold sections, and an extrusion head suspended from and reciprocable along said rail.

16. A combination as defined in claim 15, further comprising a second frame supported by said skeleton frame and supportingly connected with said rail.

17. A combination as defined in claim 15, wherein said extrusion head constitutes one of several units which are reciprocably suspended on said rail.

18. A combination as defined in claim 17, wherein said units further include a plasticizing cylinder arranged to supply plasticized material to said head and means for effecting transfer of plasticized material from said plasticizing cylinder into said head.

19. A combination as defined in claim 1, wherein each of said upright means comprises a pair of parallel vertical uprights consisting of profiled metallic stock and said tie rod means comprises a pair of upper and a pair of lower tie rods, each of said tie rods connecting one upright of one of said pairs with one upright of the other pair and said upper and lower tie rods being respectively located at levels above and below said mold sections.

20. A combination as defined in claim 19, wherein each of said hinge means comprises a horizontal pintle and further comprising biasing means operating between each pair of said uprights and the respective platen, said biasing means comprising springs disposed above and below the respective pintles.

References Cited

UNITED STATES PATENTS

| | | | |
|---|---|---|---|
| 3,115,673 | 12/1963 | Rudolph | 18—5 |
| 3,212,129 | 10/1965 | Craig et al. | 18—5 |
| 3,215,406 | 11/1965 | Perry et al. | 18—5 |
| 3,402,431 | 9/1968 | Fogelberg et al. | 18—5 X |

WILBUR L. McBAY, Primary Examiner

U.S. Cl. X.R.
264—98